United States Patent [19]

Hals

[11] Patent Number: 4,617,046
[45] Date of Patent: Oct. 14, 1986

[54] METHOD FOR THE HEAT PROCESSING OF GLASS AND GLASS FORMING MATERIAL

[75] Inventor: Finn A. Hals, Lexington, Mass.
[73] Assignee: Gas Research Institute, Chicago, Ill.
[21] Appl. No.: 784,465
[22] Filed: Oct. 4, 1985
[51] Int. Cl.$^4$ .............................................. C03B 5/10
[52] U.S. Cl. ...................................... 65/134; 65/27; 65/135; 55/1; 55/69; 55/73; 423/210.5; 423/235
[58] Field of Search ................... 65/337, 346, 347, 27, 65/134, 335, 135; 55/1, 69, 73; 423/235, 210.5

[56] References Cited

U.S. PATENT DOCUMENTS

| | | | |
|---|---|---|---|
| 296,277 | 4/1884 | Schulze-Berge | 65/335 |
| 1,889,511 | 7/1928 | Ansler | 65/335 |
| 2,006,947 | 6/1930 | Ferguson | 65/335 |
| 2,398,952 | 12/1941 | Nachod | 65/335 |
| 2,455,907 | 4/1944 | Slayter | 65/335 |
| 3,077,094 | 2/1958 | Jack et al. | 65/335 |
| 3,510,289 | 8/1964 | Boivent | 65/335 |
| 3,526,492 | 9/1968 | Motsch | 65/335 |
| 4,244,930 | 1/1981 | Weber | 423/235 X |
| 4,328,019 | 4/1982 | DeJaiffe et al. | 65/27 X |
| 4,381,934 | 5/1983 | Kunkle et al. | 65/135 |
| 4,475,936 | 10/1984 | Aston et al. | 65/142 |
| 4,504,450 | 3/1985 | Forbes | 55/73 X |
| 4,519,993 | 5/1985 | McGill et al. | 423/235 |
| 4,553,997 | 11/1985 | Hnat | 65/347 |
| 4,559,071 | 12/1985 | Kunkle et al. | 65/335 X |

FOREIGN PATENT DOCUMENTS 0073872  6/1975  Japan .................................. 423/235

Primary Examiner—Arthur Kellogg
Attorney, Agent, or Firm—Melvin E. Frederick

[57] ABSTRACT

A method of controlling $NO_x$ emissions from a combustion chamber wherein non-combustable particulate matter is heat processed. The particulate matter to be heat processed is entrained and dispersed in the products of combustion as a dispersed heat sink in a quantity and particle size to absorb heat by heat transfer from the products of combustion sufficient to cool the products of combustion from their peak temperature at a rate sufficient to kinetically limit the formation of NO in the products of combustion to a level which is a fraction of the NO equilibrium concentration of the products of combustion at their peak temperature. The fuel and oxidizer producing the products of combustion is burned in an equivalence ratio selected to result in substantially not more than small amounts of NO forming gases.

15 Claims, 7 Drawing Figures

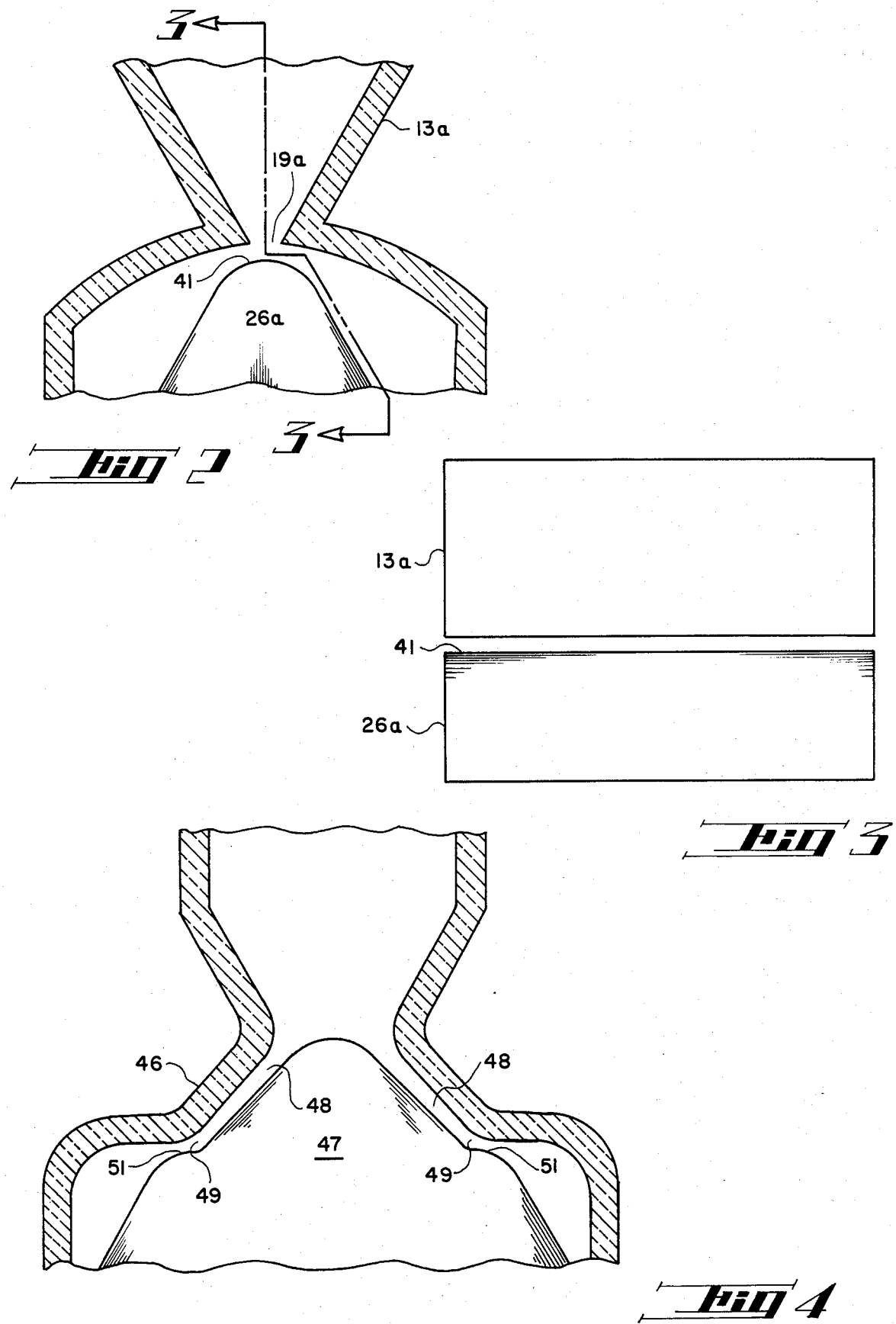

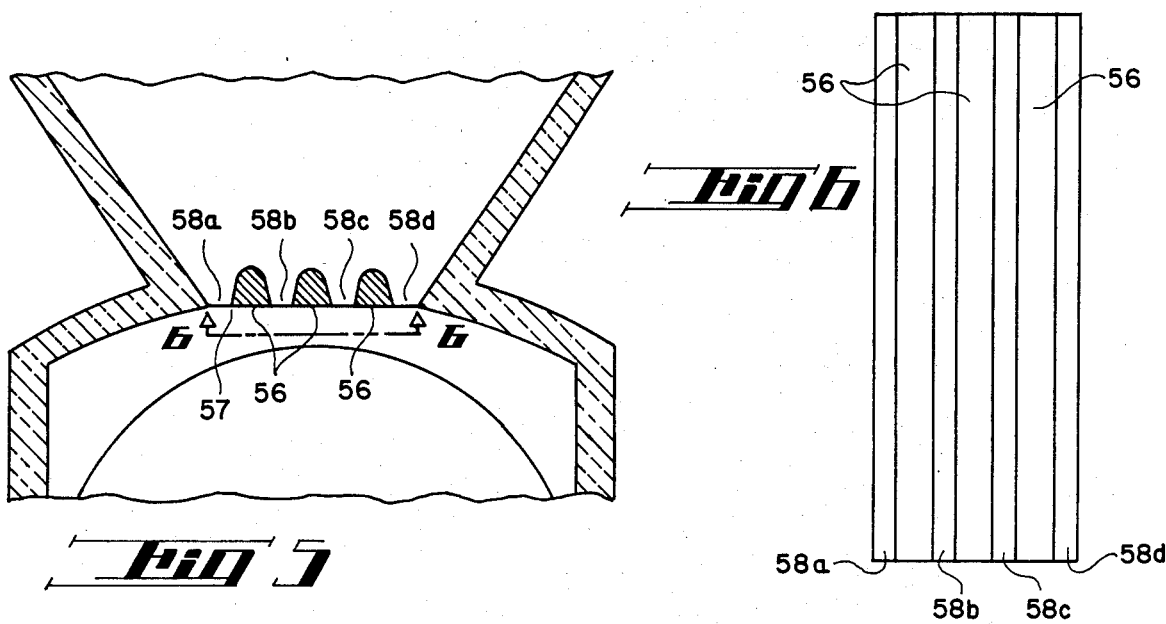
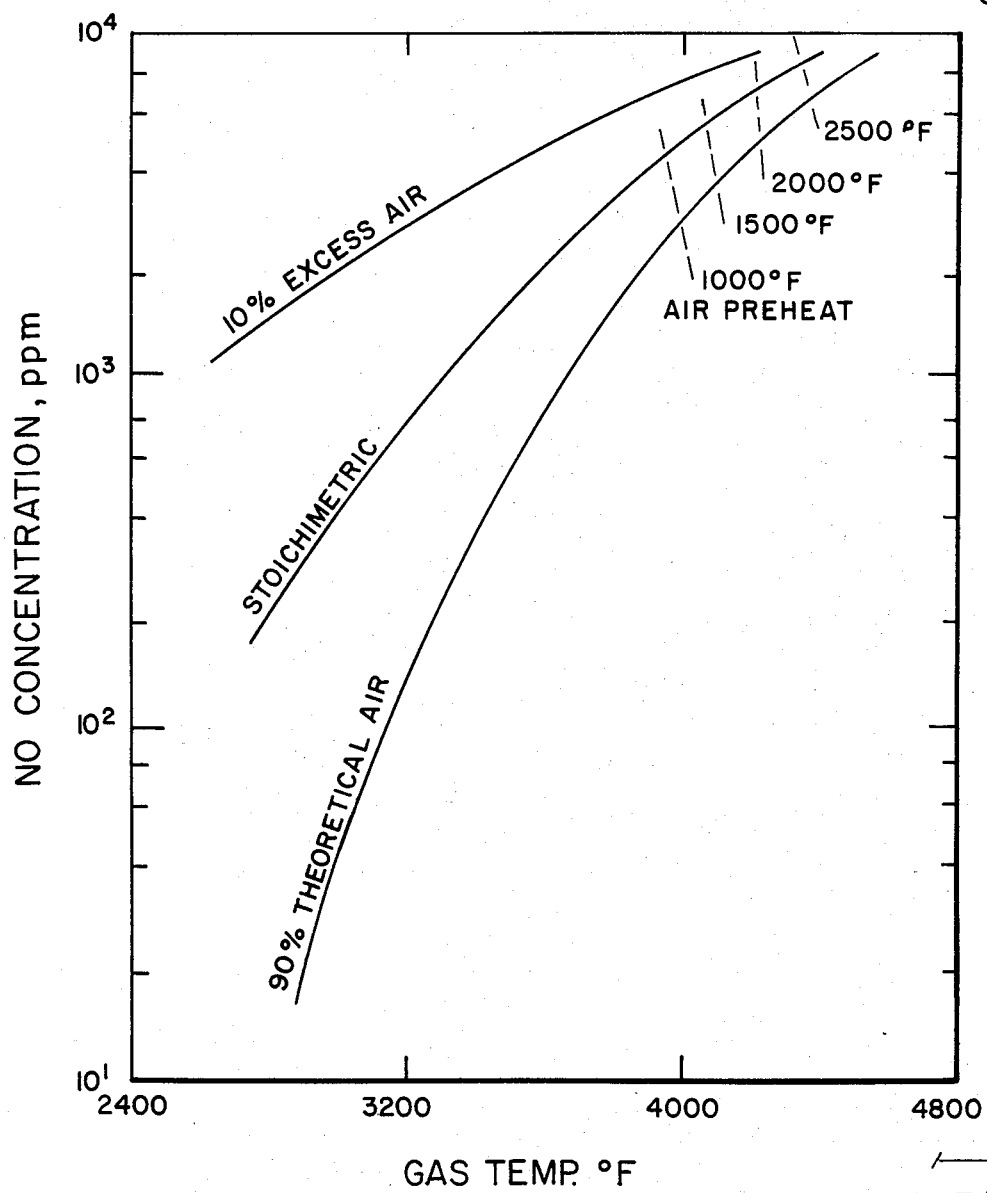

METHOD FOR THE HEAT PROCESSING OF GLASS AND GLASS FORMING MATERIAL

This invention relates producing a glass product by heat processing of glass and/or glass forming material and more particularly to a method of and apparatus for melting and making glass.

DISCUSSION OF PRIOR ART

The regenerative open-hearth type glass furnace is the primary design used for glass melting in the United States and other parts of the world. Over the years, many design changes have been made, but the fundamental heat transfer mechanisms are still quite similar to those introduced by the Siemens family in the late 1800's.

Most glasses are prepared by charging raw materials into a furnace heated to about 1093° C. (2000° F.) or more to melt and react the raw materials to form a bed of molten glass. The raw materials (including previously made glass and/or cullet) are usually called "batch" and in producing glass it may, for example, comprise a source of sodium such as sodium carbonate and a source of silica such as sand, as well as other or different compounds or minerals. The "batch" is charged to the furnace and floats on previously produced molten glass until it melts and reacts to become part of the molten glass. The terms "glass batch", "glass batch material", and "batch" as used herein and in the claims are used generically and include cullet, and/or necessary or appropriate raw materials for making and/or processing all kinds of glass whether in solid, molten or partially molten condition.

Because open-hearth furnaces primarily rely on radiation for heat transfer, the surface area of the melter is necessarily quite large. The large surface areas of open-hearth type furnaces, even with substantial insulation, lead to wall heat transfer losses that are on the order of 20 percent of the thermal input to the melter. These high wall losses together with heat losses from the stack gases and from the cooling of the molten glass itself are major factors contributing to the low operating efficiency characteristic of current glass furnace design.

In the glass industry, it is common to quote furnace performance in terms of a heat rate which is defined as the fuel thermal input to the furnace per ton of glass melted. Thus, for example, for a furnace heat rate measured in terms of of $10^6$ BTU/ton of glass melted, typical heat rates for container glass are about 5.0–5.5, for float glass it is about 6.0, and for fiberglass it is about 7.0.

The average present day container glass furnace has a heat rate of about 2.53 times the theoretical maximum. This corresponds to a thermal efficiency, defined as the heat absorbed by the glass batch in the melting process to the thermal input to the furnace, of slightly less than 40 percent. Improvements in existing regenerative furnace designs suggest that, in the absence of emission controls, thermal efficiency on the order of a maximum of 50–55 percent may be possible. However, provisions for pollution control and efficient control of $NO_x$ emissions leads to a significant derating of as much as 10 percent in furnace performance in addition to a substantial increase in capital and/or operating costs for the glass furnace. The efficient utilization of energy and compliance with environment standards are therefore recognized as major problems in the operation of current fossil fuel-fired glass melting and glass making systems.

Present day methods of melting and/or making glass entails the combustion of large amounts of fuel in a melting furnace in order to provide the required melting temperatures by direct heating. The fuel (natural gas and sometimes fuel oil) is usually mixed with an excess of air beyond that theoretically required for complete combustion in order to assure that complete combustion actually occurs within the furnace for the sake of thermal efficiency, and, particularly in the case of flat glass melting operations, to assure that oxidizing or nearly neutral stoichiometry conditions are maintained within the furnace. The air is typically preheated both to provide sufficient flame temperature and to enhance furnace efficiency. This combination of conditions within a glass furnace is conducive to the oxidation of nitrogen in the combustion air to $NO_x$.

$NO_x$ is a short-hand designation for NO and/or $NO_2$. In the high temperature conditions of a glass melting furnace, the oxide of nitrogen formed is almost entirely NO, but after or as the combustion gases cool to exhaust gas temperatures, much of the NO is converted to $NO_2$. $NO_2$ is considered an objectionable air pollutant and it is also believed to be involved in the chemistry of smog formation. Therefore, present day large volume combustion sources such as glass melting furnaces are highly susceptible to governmental regulation that will severely restrict their operation.

Many proposals have been made for controlling $NO_x$ emissions from boilers, internal combustion engines, and the like, but most are incompatible with process furnaces as employed for melting glass. Many of the previous proposals involve catalytic destruction of $NO_x$, but catalytic treatment of glass furnace emissions has been found to be unsatisfactory because the required catalyst contact devices quickly become plugged and corroded due to the particulate content and corrosiveness of glass furnace exhaust gases. Other proposals involve modifying combustion conditions, but substantial modifications in present day glass melting furnace are restricted by the requirements of the melting process. Some $NO_x$ control proposals involve treating the exhaust gas within narrow temperature ranges, but in a glass furnace employing regenerators, wherein the firing is reversed periodically, the exhaust gas temperatures are continually changing. Yet another category of prior art $NO_x$-removal processes entails chemically reacting the $NO_x$ at reduced temperature, usually in a liquid phase. Such techniques appear to be prohibitively costly for application to glass furnace emissions due to the large cooling capacity and chemical consumption requirements and liquid waste disposal problems. It has been proposed to "afterburn" exhaust gases to reduce $NO_x$ formation by injecting additional fuel downstream from the main combustion zone. However, the reaction apparently is relatively inefficient, resulting in a relatively low rate of $NO_x$ suppression and/or excessive fuel consumption as practiced in the prior art.

A non-catalytic process for selectively reducing NO to nitrogen and water comprises injecting ammonia into the exhaust gas stream. Because it does not require catalysts or process modifications, such a technique would be attractive to glass producers, except that the process is effective in only a narrow range of temperatures.

Of the present day glass melting furnaces that are not of the open-hearth design, one is a special purpose furnace that has been developed for producing reflective glass beads from cullet. This type of special purpose furnace is a vortex combustion furnace wherein a burner at the bottom of an updraft furnace produces a vorticial flow of combustion gases and entrained cullet. The particles of cullet follow a spiral path in the vortex, are heated, melted to form glass beads, cooled, and finally collected at the bottom of the furnace. For a further discussion, reference is made to U.S. Pat. No. 4,475,936.

A glass melting furnace not of the open-hearth design is described in U.S. Pat. No. 3,077,094. This patent is directed to cyclone furnace wherein particulate glass making material is delivered in suspension in combustion gases directed tangentially as a rotating stream into a recessed cylindrical pocket disposed at the top of the furnace. In normal operation, the residue time in the pocket is 5–10 minutes and the material in a partially molten state then travels as a thin layer in a spiral path down the sides of the furnace to an outlet where it is collected outside the furnace in a pot or the like, which may be used in the process of refining the glass delivered into it.

Another glass melting furnace not of the openhearth design is described in U.S. Pat. No. 4,381,934. This patent is directed to the first stage of dual stage melting or production of glass. In this first stage, a transient layer of incompletely melted glass batch material comprising a foamy opaque fluid including unmelted sand grains and the like is produced on a pedestal disposed within a heating chamber. Dry glass batch material is mechanically continuously deposited on the pedestal as by a screw feeder or the like. Heat for melting is provided by a plurality of radiant sources arranged to provide substantially uniform heat to all sides of the pedestal. As the dry glass batch material liquifies, an incompletely melted layer runs down the surface of the pedestal and falls into a pool whereafter fining and completion of the formation of the glass product occurs.

A further proposed glass melter or furnace more fully disclosed in U.S. patent application Ser. No. 585,978, filed Mar. 5, 1984, now U.S. Pat. No. 4,553,997 entitled "Process for Melting Glass In a Toroidal Vortex Reactor", filed by James G. Hnat, is a derivative of the slagging coal combustor developed for magnetohydrodynamic (MHD) power generation applications. For a further discussion of such slagging coal combustors and cooled walls used therein see the references set forth hereinafter. In extending this MHD combustor technology to the conceptual design of a glass melter, rather than burning coal, it is proposed that finely pulverized glass batch be heated very rapidly by injecting it into a gas-fired combustor. The high temperature batch, (which in the case of coal combustion originates as coal mineral content and forms slag which is a glassy material) under control of the fluid dynamics of a multiple burner, vortex design, is projected to the walls of a melting chamber where it thereafter flows down as a viscous layer (in the same manner as slag) and through a glass tap in the bottom of the furnace. The layer of glass on the melter walls also functions to insulate the walls in the same manner as in the aforementioned slagging coal combustors. Assuming effective downstream heat recovery, thermal efficiencies as high as 75 percent have been predicted. The melting process is accomplished by preheating the batch materials disposed in suspension within an injector/burner assembly comprising a plurality of burners located and directed to generate an upwardly directed vorticial flow, mixing and fusing the batch particles within the upwardly directed vortex generated by the burners, and depositing agglomerated glass particles and/or individual batch droplets/particles on the vortex melter top wall by fluid mechanical centrifugal forces generated by the vortex flow. The melting process in the vortex melter is accomplished by the combined effects of conductive, convective, and radiative heat transfer from the gas to particles in suspension which have a large total surface area, as opposed to conventional techniques in which the surface area of the batch exposed to heat transfer is a small portion of the theoretical bulk charge particle surface area. This type of melter operates at high combustion intensities and wall heat fluxes. However, because of the relatively small surface area of the melter, the total enthalpy losses relative to the total thermal input is small although the walls must be both cooled and non-reactive with glass. Experience with slagging magnetohydrodynamic coal combustion suggest that wall heat transfer losses may be expected to be 5–7 percent of the thermal input, as opposed to conventional glass melters which have wall heat transfer losses on the order of about 15–25 percent or more.

SUMMARY OF THE INVENTION

The present invention provides a method of and apparatus for heat processing particulate material wherein finely pulverized glass batch material is heated very rapidly by preheating and mixing glass batch material in suspension in preheated oxidizer and/or fuel flow in an injector assembly, heating the glass batch material to a high temperature in the burner assembly, directing the products of combustion and high temperature batch material suspended therein through an accelerating nozzle, to form a preferably downwardly directed preferably linear flow having a small cross sectional area, and causing the accelerated directed flow exiting from the nozzle to impact on an impact surface, the high temperature batch material adhering to this impact surface which may form part of a central body, and then flow down its sides to a collection zone.

In accordance with the present invention, glass batch material is heated in suspension in the products of combustion to a condition at which it can form a flowing layer on the impact surface and rapidly react to form glass product. The central body, when utilized in accordance with the invention, provides the multiple function of separation of the glass batch material from the products of combustion, fining and at least substantial reaction of the constituents of the glass batch material.

In addition to efficient heat transfer, in accordance with a feature of the present invention, highly effective glass fining may be provided by a thin flowing melt layer having strong internal shear motion more fully discussed hereinafter. Thus, prior art fining agents, such as sulfates, are not required and this eliminates a source of $SO_x$ pollutant emission. The present invention also allows accurate control of combustion stoichiometry, so that carbon addition to the batch, as would normally be required for reduced flint glass production, is not necessary.

Glass melters in accordance with the present invention have a higher degree of efficiency than that of the vortex type melter and cost substantially less to construct and operate due to its improved construction and operating features.

Another feature of furnaces constructed in accordance with the present invention is the control of pollutants. The furnace operating characteristics and its design features also result in a reduction of material carry-over from the furnace by impact, volatilization and physical entrainment than that which may be expected to be present in the vortex type furnace. Thus, the amount of particulates in the exhaust gas and emission control equipment needed are reduced to a minimum.

If in the rapid combustion process of the present invention, no excess air is permitted and/or the burner is operated fuel rich, the provision of a very short residence time of the combustion gases in the furnace, together with very rapid reduction in temperature of the combustion gases controlled by the absorption of heat by the glass batch material entrained up-stream of the flame holder in the burner, permits the formation of $NO_x$ to be maintained at a minimum. The concentration of nitrogen oxides in the gas can be controlled to be at or below a desired efficient level of about 4.0 lb $NO_x$/-ton glass. Further, since the flow process described below eliminates the need for fining agents such as sodium sulfate, $SO_x$ emissions resulting from the prior art use of salt cake may be eliminated.

The present invention permits the provision of a glass melting furnace that is a very small fraction of the size of a conventional open hearth melting furnace. Such a furnace can provide improved operating efficiency over current melting systems by at least about 50 percent or more while at the same time reducing capital costs by at least about 40 percent or more. Still, further, the present invention permits achievement of all of the above noted advantages as well as control of the generation of all pollutants to a level at or below that presently deemed to be a maximum with minimum if any material carry-over in the exhausting gases.

THE DRAWINGS

FIG. 2 is a fragmentary elevation end view of a nozzle having a substantially rectangular outlet and associated impact surface;

FIG. 3 is a side elevation view of the nozzle and impact surface of FIG. 2 taken on line 3—3.

FIG. 4 is a fragmentary side elevation view with parts broken away of a further embodiment of the nozzle and impact surface wherein the nozzle and impact surface cooperate to define an annular nozzle outlet;

FIG. 5 is a fragmentary side elevation end view of a still further embodiment of a nozzle similar to that of FIG. 2, but wherein the nozzle has a plurality of rectangular outlets;

FIG. 6 is a bottom view of the nozzle of FIG. 5 taken on line 6—6; and

FIG. 7 is a graphic representation of the equilibrium concentrations of NO in ppm by volume in a combustion gases for several air-fuel gas equivalence ratios.

Figure 1:
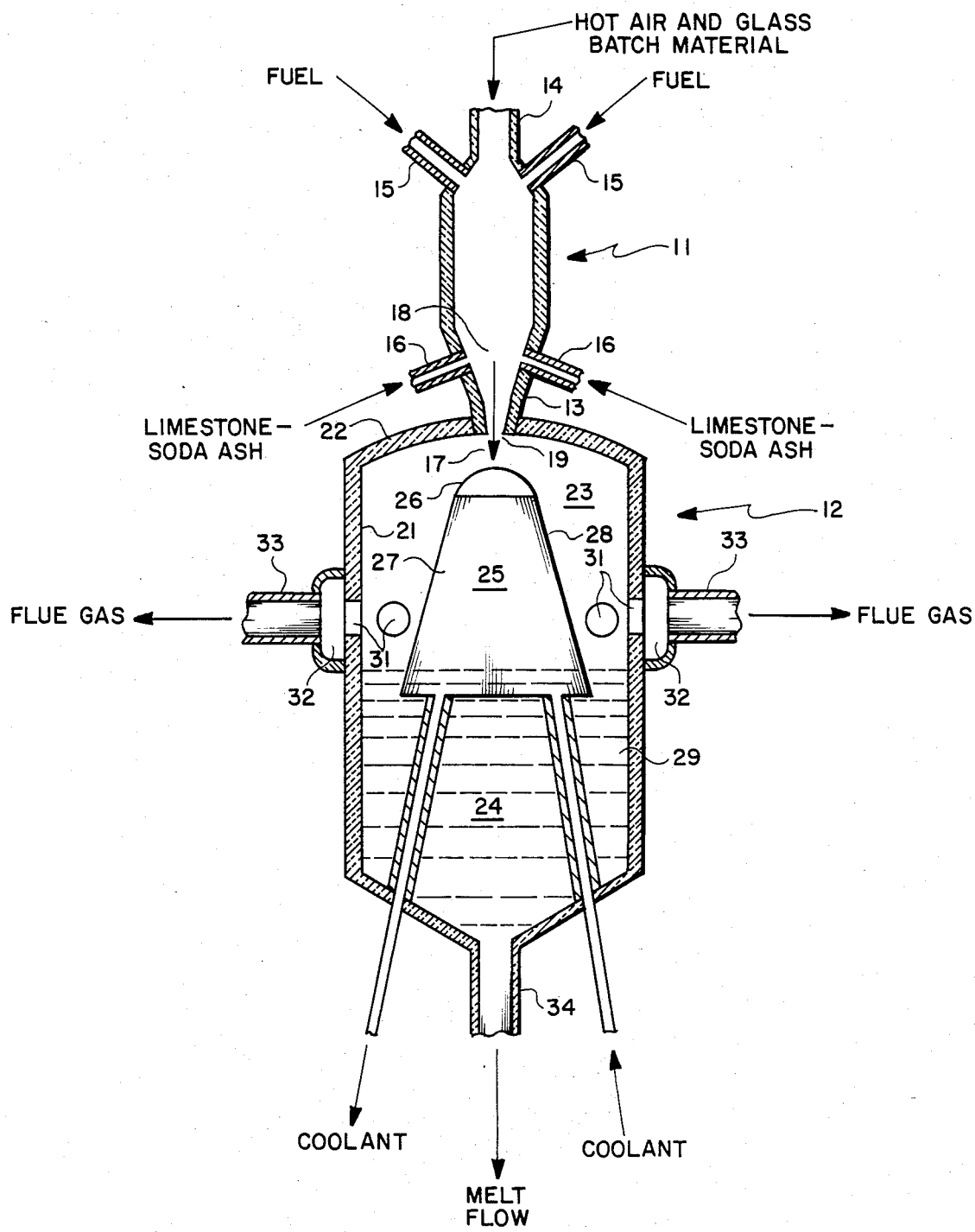
FIG. 1 is a schematic side elevation view of apparatus in accordance with the invention.

Referring now to FIG. 1, this figure illustrates by way of example the process and apparatus of the present invention for heat processing glass batch material such as melting cullet and/or melting raw materials for forming glass and provide a bed of molten glass for use in a conventional manner.

Fuel, oxidizer and glass batch material are introduced into the combustion chamber as shown in FIG. 1. The fuel may include petroleum fuel, but preferably is a gaseous fuel such as, for example, natural gas, and the oxidizer is preferably preheated air and/or oxygen enriched air.

The combustion chamber 11 may be of any conventional construction suitable for operation at high temperatures and processing glass batch material and is coupled to a separation chamber 12 by a 13 nozzle more fully described hereinafter.

The fuel and air are introduced, mixed and burned in conventional manner to produce products of combustion to heat glass batch material entrained therein to the necessary reaction and/or glass melting temperature as more fully described hereinafter. In the combustion chamber 11, the reaction of fuel and air provides combustion products of about 2500° to 4000° F. depending on the type, temperature and quantity of the fuel, oxidizer and glass batch material used and to what extend preheating is used.

Preferably, preheated glass batch material which may comprise, for example, preheated silica sand, cullet, syenite and suitable sodium and calcium minerals are heated and homogenously dispersed in conventional manner in the oxidizer or air flow which is introduced into the combustion chamber through pipe 14. Fuel, preferably natural gas, is introduced through pipes 15, mixed with the oxidizer or air, ignited by a conventional flame holder in conventional manner in the combustion chamber 11. Satisfactory thermal equilibrium of this two phase flow may be expected to require a flow time of about 30 msec or more before injection into the combustion chamber.

A suitable equilibrium particle and air temperature is in the range of about 1500° F. and may be introduced at a pressure of about 3 psig. The air may be preheated to a temperature to about 2200° F. for a glass batch material flow rate approximately equal to the combustion gas flow rate. The glass batch material in turn may be preheated to a temperature of about 600° F.

Since silica, cullet and syenite and the like do not appear to have a major impact on flame stability, they are preferably introduced into the oxidizer or air flow and entrained in the products of combustion. However, since carbonates such as limestone, soda ash and the like may have an adverse effect on flame stability they should be entrained into the products of combustion downstream of the ignition point as through pipes 16. The combustion chamber size scale is controlled by throughput, volumetric heat release and particle heat transient time.

The products of combustion and entrained glass batch material is exhausted from the combustion chamber 11 through a convergent nozzle 13 that provides an exit velocity of about several hundred feet per second or more. A convergent nozzle with a convergence half angle of about ten degrees will provide an acceptable particle velocity slip. The nozzle 13 preferably provides uniform particle distribution in the products of combustion which is exhausted by the nozzle as a directed, exhaust stream 19. Glass batch material carbonate particulates such as, for example, limestone and soda ash may be homogeneously dispersed in and introduced at the nozzle flow region 18 to minimize the time during which they are exposed to high temperatures before inclusion in the melt layer. The products of combustion should provide a heat rate of about $2.91 \times 10^6$ Btu/Ton of glass and to preferably produce molten glass at a temperature of about 2600° F. for a conventional soda-lime glass for example. Glass melting reactions can occur at temperatures as low as about 1900° F. but the reaction times for such low temperatures are too long for practical glass melting operations in accordance with the present invention.

The exhaust stream 17 exits from the nozzle outlet 19 into a separation chamber 12. While the configuration of the separation chamber is not critical, it may be, for example, cylindrical as shown in FIG. 1 or other conventional shape and formed in conventional manner for production of glass and operation at glass melting high temperatures. It is not intended, and the design of the separation chamber should be such that very little and preferably no glass batch material (except possibly for purposes of insulation) be deposited on the exposed inner wall surfaces 21 of the separation chamber 12. The outlet 19 of the nozzle 13 for an embodiment as shown by way of example in FIG. 1 is centrally disposed in the top wall 22 of the separation chamber 12. The nozzle 13 and separation chamber 12 may each have a line of symmetry, each be symmetrical with its line of symmetry and these lines of symmetry should be at least substantially coincident one with another.

The separation chamber is provided with an upper separation portion 23 and a lower glass collection portion 24. Disposed within the separation chamber is a center body member 25 having an upper impact surface portion 26 disposed in the separation chamber upper portion 23 and a glass flow portion 27 extending from the impact surface portion to the lower molten glass collection portion 24 of the separation chamber. While the impact surface portion 26 may have a configuration other than generally hemispherical as shown in FIG. 1, it should have and be at least substantially symmetrical with its line of symmetry at least approximately coincident with the line symmetry of the nozzle. Further, the impact surface should be of a size and configuration and spaced a distance from the nozzle outlet that substantially all of the entrained glass batch material in the exhaust stream 17 emanating from the nozzle outlet 19, and especially the smaller sized particles, will strike the impact surface.

The impact surface portion 26 as shown in FIG. 1 is illustrated for purposes of example, essentially hemispherical in shape and spaced from the nozzle outlet 19 preferably not more than several times the diameter (if circular) or minimum dimension of the nozzle outlet (if noncircular). A suitable distance is about 2.5 times the diameter of a circular nozzle outlet. The impact surface portion 26 must be closely spaced to the nozzle outlet to provide effective separation of the glass batch material from the products of combustion. This is necessary because as this distance is increased greater and greater quantities of the smaller size particles will be carried past the impact surface portion by the gas flow. The glass flow portion 27 is provided with a smooth generally conical outer surface 28 extending from the impact surface portion 26 to and into the molten glass collection portion 24 to receive the melt flow or molten glass flow from the impact surface portion 26 and direct it into the molten glass pool 29 in the glass collection portion 24 of the collection chamber. As will become evident hereinafter, the nozzle and center body member need not be annular in shape as shown by way of example in FIG. 1. However, it is important that the impact surface portion and outer surface portion of the center body member be shaped and configured to avoid flow separation of the products of combustion over the exposed surfaces of these portions. This is necessary to insure maximum heat transfer, drive for the melt flow and strong internal shear motion more fully discussed hereinafter.

In practice it is advantageous to provide cullet, or the like, as a constituent in the glass batch material. This is effective in improving the adherence of other glass batch material since some may not be softened or melted when it reaches the impact surface portion 26 whereas the cullet is more likely to be or become molten at or shortly after it impacts on the impact surface portion 26. This facilitates the continuous provision of a molten layer on the impact surface portion 26 which will capture most if not all of any unmelted particles.

Uniformly spaced flue gas ports 31 are provided in the side walls of the separation chamber for receiving the products of combustion or flue gas at a level preferably a short distance above the top of the molten glass pool 29 and directing them circumferentially uniformly into a plenum chamber 32 where they can be withdrawn through pipes 33 and thereafter directed to heat exchangers and the like and used in conventional manner. Molten glass is removed from the molten glass pool via duct 34 and used in conventional manner.

The provision of apparatus in accordance with the present invention wherein the exhaust stream is caused to exit from a combustion chamber via a nozzle and impact on a closely spaced preferably hemispherical impact surface portion to a separation chamber, in addition to other numerous other advantages discussed earlier, provides, as compared to the prior art, more simply, efficiently, and economically, particle capture and improved distribution uniformity and homogenization of the glass batch material.

Separation of the glass batch material at the impact surface portion 26 utilizes the inertia of the glass batch material in the sharply turned gas flow field generated at the impact surface portion. In addition to the advantages noted immediately herein above, the present invention provides substantially improved separation because of the close proximity of the nozzle outlet 19 and the impact surface portion 26 which for any given velocity provides minimum turbulence, maximum turning of the gas flow at maximum velocity for minimum pressure drop, and maximum separation.

The impact surface portion 26 and flow surface portion 27 may, for example, be each formed of a first outer or exposed metal member (not shown) on which glass batch material is deposited and a second inner or rear metal member having disposed between them coolant passages (not shown) for receiving a coolant such as water adapted to maintain the outer metal member at less than its failure temperature. The cooling of the outer metal member is effective in preventing its failure and in causing molten glass batch material at the exposed surface of the inner metal member to solidify and therefore function to protect it from erosion by the high temperature glass batch material being continuously deposited.

The above-noted water-cooled portions provide surfaces to which the particles of glass batch material can adhere to form a continuous layer of glass which builds up to an equilibrium thickness based on the gas shear forces, melt viscosity and gravity. At equilibrium, the aforementioned glass layer comprises an inner layer of frozen or solidified glass with a steep temperature gradient and is covered with a preferably thin layer of molten glass at a temperature somewhat lower than the gas temperature.

Broadly, heretofore, the most successful method of causing a silicate slag material to adhere to a cooled metallic surface has been to provide in the cooled surface regularly spaced ceramic surfaces to which the slag will readily adhere. For this purpose, castable ceramic material may be trowled into machined grooves which may be typically one-fourth inch wide at a one-half inch pitch. From these initial attachment points, slag was found to gradually bridge over the exposed metal to form a continuous uniform layer. The walls to which the glass batch material adheres may be of similar prior art construction which will provide the same result. Another wall treatment which may be used is the provision of a continuous ceramic coating applied by a plasma gun.

The technology establishing a coating as a flow over a cooled metal wall as noted above was extensively developed during the past decade with specific orientation toward the use of silicate slags derived from coal combustion as erosion barriers and insulators. This technology development had its origin in open cycle MHD power generation hardware testing and was aimed at developing wall structures for MHD components that would be compatible with high temperature silicate slags from coal combustion products.

For more thorough discussion of this technology as well as the construction and fabrication of suitable impact surface and flow members, reference is made to "Replenishment Analysis and Technology Development," by D. B. Stickler and R. DeSaro, Sixth International Conference on MHD Electrical Power Generation, Washington, D.C., June 1975; "Controlled Utilization of Coal Slag in the MHD Topping Cycle," by D. B. Stickler and R. DeSaro, presented at the Engineering Foundation Conference on Ash Deposits and Corrosion Due to Impurities in Combustion Gases, held at New England College, Henniker, N.H., June 26–July 1, 1977; "Slag-Coated Wall Structure Technology for Entrained Flow Gasifiers," by D. B. Stickler and R. E. Gannon, presented at the 1981 International Gas Research Conference, Sept. 28–Oct. 1, 1981, Los Angeles, Calif. which are hereby incorporated herein as if set out at length; "Unique Combustion System For Oil to Cool Conversions," by R. K. Mongeon and D. B. Stickler, presented to Joint Power Generation Converence, Toronto, Canada, Sept. 30–Oct. 4, 1984 and Industrial Power Conference, Philadelphia, Pa., Oct. 28–31, 1984; and "Toroidal Flow Pulverized Coal-Fired MHD Combustor", by J. O. A. Stankevisc, A. C. J. Mattson, and D. B. Stickler, presented at the Third Coal Technology Europe 1983 Conference, Amsterdam, The Netherlands, Oct. 11–13, 1983.

Alternately, it is to be understood that the impact surface portion 26 and/or the flow surface portion 27 may be comprised of any suitable ceramic or other material that is non-reactive with glass.

Attention is now directed to FIGS. 2 and 3 which shows an alternate embodiment of the nozzle 13 and an impact surface portion 26a combination. In this case, the nozzle 13a and its outlet are rectangular in configuration and the impact surface portion 26a is substantially weged shaped with a smoothly curved apex 41. The impact surface portion 26a as previously noted, is at least substantially symmetrical with its line of symmetry which is coincident with the nozzle line of symmetry.

FIG. 4 shows a further embodiment of the nozzle and impact surface. In this case, the nozzle is provided with a divergent lower portion 46 and in cooperation with an upwardly projecting generally conical portion 47 of the impact surface forms a convergent annular nozzle 48 having an annular nozzle outlet 49. A short distance downstream from the nozzle outlet the upwardly projecting portion is provided with an outwardly extending curved annular surface or shoulder 51 which uniformly directs the exhaust stream circumferentially outwardly. It will occur to those skilled in the art that the above-noted arrangement for providing an annular outlet can also be provided with other configurations including a continuously convergent nozzle.

A still further embodiment of the nozzle impact surface combination is shown in FIGS. 5 and 6 where elongated wedge-shaped members 56 disposed at the nozzle outlet 57 form a plurality of further nozzles 58a, b, c, and d each having a generally rectangular cross section. Other configuration for nozzle impact surface combinations will occur to those skilled in the art.

The configuration of the center body member and separation chamber is preferably chosen to provide minimum flow separation and maximum uniform flow of separated combustion products adjacent the impact surface portion and melt flow on the flow surface portion. Minimum flow separation and maximum uniform flow of separated products of combustion products provides maximum heat transfer drive for the melt flow from the impact surface to the molten glass pool, and to provide strong, internal shear motion in the melt flow. In operation, there may be as previously noted, solidified glass adhering to the flow surface and molten glass covering the solidified glass. This molten glass flow from the impact surface to the molten glass pool is driven by the products of combustion or flue gas flowing toward the flue gas ports and by gravity. If operating conditions are controlled to provide a thin layer of flowing melt flow, for example, of the order of about one-sixteenth inch thick, preferably in combination with control of the separated products of combustion to produce strong internal shear motion in the melt flow, the distance or time required for a unit of molten glass to flow from the impact surface to the molten glass pool such, as for example about ten seconds or more can be easily provided whereby bubbles and/or undissolved gas in the melt flow will have more than sufficient time to immigrate or travel to the exposed surface of the melt flow and enter the flue gas flow. Similarly, unreacted particles and the like will also have more than sufficient time to complete their reaction and similarly disappear.

The provision of a temperature gradient through the melt flow, as by making the flow surface a cooled surface, as discussed hereinbefore, produces temperature gradient in the melt flow. The resulting temperature gradient through the flowing glassy material results in a gradient in surface tension around entrapped gas bubbles. This gradient in surface tension enhances the transport of bubbles to the interface with the flue gas flow and removal from the glass melt.

The provision of the above-noted control of operating parameters results in highly effective glass fining and obviates the use of conventional fining agents such as sulfates to enhance melt formation and/or fining. Further, since the above-described process does not require sulfer additives, there will be negligible $SO_x$ concentration in the flue gas exhausted from the separation chamber.

Actual tests of the embodiment shown in FIG. 1 were carried out employing a combustion chamber having a total gas flow through of 0.35 lb/sec at a pressure of 1.5 psig. Natural gas was mixed with enriched air having a nitrogen to oxygen molar ratio of 1.7 (enriched to provide 37% oxygen) and ignited to provide a combustor temperature of 2850° F. Cullet was entrained in the enriched air upstream of the combustor at the rate of 0.30 lb/sec. The generated products of combustion and entrained cullet was exhausted from the combustion chamber through a convergent acceleration nozzle having an exit nozzle diameter of 3.10 inches and provided an exit velocity of 500 ft/sec at an exit temperature of 2450° F. The inpact surface of the center body member was a water cooled Inconel convex cap spaced 7.50 inches from the nozzle outlet having a diameter of 7.0 inches. The flow surface was formed of 0.50 inch thick uncooled fused silica having a height of 20 inches at an angle of 7.5 degrees.

As noted above, there will be no $SO_x$ produced in the products of combustion or flue gas (except for very small quantities of sulfur components sometimes contained in natural gas fuel and as a trace component in cullet obtained from prior art glass) because the sodium necessary for glass making need only be supplied entirely as sodium carbonate. Therefore, in apparatus in accordance with the present invention, $SO_x$ will not represent an emission control problem.

The formation of more troublesome $NO_x$ may be controlled to levels near, if not substantially less than a desired efficient level of about of 4 lb $NO_x$/ton of glass ($NO_x$ emission of 7lb/ton of glass or more is typical for prior art processes) by controlling the extent of initial formation of $NO_x$ in the high temperature combustion products which may be as high as about 4000° F. $NO_x$ formation is controlled by preventing the existence of air and/or its constituents in the products of combustion, providing glass batch material as a dispersed heat sink within the products of combustion at a point and in sufficient quantity, and by providing a sufficiently short thermal transit time, to collectively result in cooling of the combustion products from the abiabatic flame temperature, where high $NO_x$ would result at equilibrium, to a low temperature, on a time scale short relative to $NO_x$ chemical kinetic formation time.

By selecting the parameters as noted above, $NO_x$ concentration can be held to a level well below the equilibrium gas flame, abiabatic, stoichiometric level and which results in a net $NO_x$ emission level of about 4 lbs/ton of glass or less. Further reduction in $NO_x$ in the flue gas, if deemed necessary to meet more stringent constraints may be obtained by conventional downstream destruction or capture of $NO_x$ which need be only a small fraction of that which would be necessary to reduce ab initio the level of $NO_x$ to present, let alone such more stringent constraints.

Glass furnaces operate at peak flame temperatures in excess of 4000° F. and thermodynamic equilibrium concentrations show that relatively large amounts of NO can be formed in the gas at such high combustion temperatures.

This is illustrated by the three curves in FIG. 7 where the equilibrium concentrations of $NO_x$ in ppm by volume in combustion gases are shown as a function of temperature for air-fuel gas equivalence ratios of $\phi=0.9$ (fuel rich conditions with 90 percent theoretical air), $\phi=1.0$ (stoichiometric conditions) and $\phi=1.1$ (fuel lean conditions with 10 percent excess air.

The $NO_x$ equilibrium concentrations in the gas for various calculated adiabatic flame temperatures reached by combustion with air preheated to 1000° F., 1500° F., 2000° F., and 2500° F. are indicated in FIG. 7 on the $NO_x$ equilibrium concentration curves for stoichiometric ($\phi=1.0$) and for fuel rich combustion conditions ($\phi=0.9$). For comparison, typical emission limits of nitrogen oxides in ppm in the gas for the three air-fuel equivalence ratios are given in Table 1 below for an overall system heat rate of 3.2 MBtu/ton glass produced assuming an emission limit of 4 lbsNO$_x$/glass produced which presently is considered promulgated for glass melting furnace operation.

TABLE 1

| $NO_x$ EMISSION LIMITS IN BURNER EXHAUST GAS | | | | |
|---|---|---|---|---|
| System Heat Rate - 3.2 MBtu/ton glass | | | | |
| Emission Limit - 4.0 lbs. NO$_x$/ton glass | | | | |
| Air/fuel equivalence ratio | $\phi$ | 0.9 | 1.0 | 1.1 |
| Maximum NO-concentration permissible in gas flue | ppm | 1050 | 970 | 895 |

A heat rate of 3.2 MBtu/ton glass corresponds to an overall thermal efficiency of approximately 70 percent which is attainable for a system in accordance with the present invention with gas as the sole energy source. Lower heat rates are possible for air temperatures beyond 2200° F. and with additional preheat of the glass batch material feed. Such low system heat rates will again allow correspondingly higher $NO_x$ emission limits than those set forth in Table 1 above. The actual $NO_x$ concentration in the flue gas is determined by the combustion process with the temperature-time history of the gas and the gas kinetics. Since there is negligible net decrease in $NO_x$ as the flue gas is cooled in downstream heat exchangers and the like the $NO_x$ formed and fixed in the gas in the melt furnace is the key parameter for system emission considerations.

The specie of nitrogen oxides formed during the high temperature combustion process is essentially all nitric oxide (NO). With the use of natural gas as fuel, NO is formed from the oxygen and nitrogen supplied with air, and is termed "thermal NO."

The principal chemical reactions involved in the formation and decomposition of thermal NO are:

  (1)

  (2)

  (3)

  (4)

The first three reactions, where M is a third body (usually $N_2$), represent the important and well-known Zeldovich mechanism of atomic exchange reactions. The fourth reaction can also be signification, particularly under fuel rich conditions. Several other reactions involving the $NO_x$ chemistry will also occur, but these are of lesser importance.

Significant amounts of NO formed at the high combustion temperatures in a glass furnace will become fixed in the gas as the gas is cooled down with a small amount converted to $NO_2$. Because of this the emission of nitrogen oxides ($NO_x$) represent a serious pollution problem for conventional glass melting furnaces today. $NO_x$ emission from present furnaces is typically considerably higher than the emission limit of 4 lbs $NO_x$ per ton glass produced which now is considered promulgated for glass furnace operation.

The present invention for advanced glass melting provides unique features for effective $NO_x$ emission control in furnace design and operation. In accordance with the present invention, the emission of nitrogen oxides can be controlled by limiting the amount of NO which can be formed in the gas in the furnace. The unique and novel features, utilized to limit NO formation in the gas is a short combustion time coupled with rapid cooling of the high temperature combustion gas produced by transfer of heat from the gas to the entrained particles of glass batch material in the gas. The glass batch material entrained and dispersed in the gas represents an effective heat sink which makes it possible to cool the gas down from its peak flame temperature where the NO equilibrium concentration is high to a lower temperature where the $NO_x$ equilibrium concentration is relatively low in a very short time period. This rapid cooling of the gas together with a short combustion time result in a very short residence time of the gas at higher temperatures so that the amount of NO formed in the gas becomes kinetically limited. To minimize NO formation it is also important to minimize the oxygen concentration in the gas. This is attained by performing the high temperature combustion at essentially stoichiometric or slightly fuel rich conditions.

The lowest NO concentration in the gas can be attained for fuel rich conditions, although this may be achieved at a certain penalty in thermal furnace efficiency which is considered maximized for stoichiometric combustion conditions. The optimum global and local stoichiometric conditions in the furnace will be established from consideration of minimum NO-formation, high thermal furnace efficiency and glass product quality. Staged combustion or afterburning of the furnace exhaust gas is also included as possible modes of operation. Although natural gas here is considered as the fuel source the method of $NO_x$ control discussed is applicable to other gases or liquid fuels as well and is not limited to melting or production of glass.

The residence time of the gas at peak combustion temperature is minimized by providing conditions for rapid combustion of the fuel at very high volumetric heat release rates and for high heat transfer to the suspended batch particles. The gas residence time at peak (adiabatic) temperature may be very short, on the order of 2 msec.

Preliminary kinetic calculations show that the amounts of NO formed in the gas at peak flame temperatures of 4100°–4200° F. reached, for example, by combustion of natural gas with air preheated to 2200° F., are less than the NO concentration limits listed in Table 1 for stoichiometric and fuel-rich combustion conditions with the above-mentioned gas residence time of 2 msec at peak flame temperature. The addition of excess air, which is used in prior art melt furnaces today, is undesirable because it results in excessive NO formation because of the increased oxygen concentration in the gas.

The hot combustion products produced are rapidly cooled from their peak adiabatic flame temperature by the transfer of heat to the suspended batch particles. This cooling of the gas is most rapid initially when the heat transfer rate from the gas is very high. Accordingly, the gas is assumed cooled from its peak flame temperature to about 3600° F. in less than 10 msec and further down to its exhaust temperature of about 2700° F. in an additional 20–30 msec. As the gas cools in the furnace, some additional NO will be formed in the gas. However, the total amount of NO in the exhaust gas will still be less than the NO concentration emissions limits listed in Table 1 both for stoichiometric and fuel-rich combustion conditions. Fuel-rich combustion yields the lowest final NO concentration in the furnace exhaust gas in which case it is calculated to be less than half of the assumed $NO_x$ emission limit (4.0 lb. $NO_x$/ton glass produced). The NO formed becomes essentially fixed in the gas at a temperature of about 3500° F., as the gas cools in the furnace, as above noted. Also, the temperature of the furnace exhaust gas of about 2700° F. is too low for decomposition of nitrogen oxides to occur by homogeneous gas reactions in the downstream heat recovery equipment. Thus, the amount of NO initially formed and fixed in the furnace exhaust gas remains in the stack gas.

Reduction of NO in the furnace exhaust gas may be obtained by prior art methods for destruction and removal of NO such as the use of ammonia and/or catalytic reduction. This removal of NO in the exhaust gas, if deemed necessary to meet more stringent future $NO_x$ emission regulations, need then be only a fraction of that otherwise necessary for more conventional glass furnace operation and consequently will be more economical.

The various features and advantages of the invention are thought to be clear from the foregoing description.

It is to be understood that the scope of the present invention includes, for example, albeit a less desirable embodiment, effectively turning the apparatus of FIG. 1 inside out and placing the combustion chamber within the separation chamber whereby the exhaust stream from the nozzle is now directed upwardly and impacts on the top wall which may now be concave and which is formed and functions as heretofore described as the impact surface portion and the walls of the separation chamber now become the flow portion.

Further, a series of nozzle-center body combinations may be provided to increase output. It is to be further understood that the provision of a hot gas stream for melting glass batch material need not be limited to gas or other combustion sources and where desired may be supplied or supplemented by other radiant energy sources utilizing suitable gases such as, for example, electric arc, electric arcs plasma sources, nuclear energy and the like or any combination thereof.

The vertical downflow embodiment of the present invention is particularly advantageous in that it permits the simplest, most economical and dependable construction; operation, maintenance and repair of systems for producing a glass product.

Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In the method of controlling $NO_x$ emissions from a combustion chamber for heat processing non-combustible particulate matter in which combustion of fuel produces products of combustion including $NO_x$ compounds which is vented to the atmosphere, the steps comprising:
   (a) introducing and burning in a combustion chamber a fuel and an oxidizer and producing therefrom products of combustion at a peak temperature greater than the temperature at which NO is formed and capable of forming a substantial amount of NO equilibrium concentration in said products of combustion at said peak temperature; and (b) providing entraining and dispersing of noncombustible particulate matter to be heat processed in said products of combustion as a dispersed heat sink in a quantity to cool said products of combustion from its peak temperature at a rate sufficient to substantially kinetically limit the formation of NO in said products of combustion to a level which is a fraction of the said NO equilibrium concentration for said products of combustion at said peak temperature.

2. The method as called for in claim 1 wherein said fuel and oxidizer is burned in an equivalence ratio selected to result in substantially not more than small amounts in said products of combustion of oxygen.

3. In the method of controlling $NO_x$ emissions from a combustion chamber for heat processing non-combustible particulate matter in which combustion of fuel produces products of combustion including $NO_x$ compounds which is vented to the atmosphere, the steps comprising:

(a) introducing and burning in combustion chamber a fuel and an oxidizer and producing therefrom products of combustion at a peak temperature substantially greater than the temperature at which NO is formed; and (b) providing entraining and dispersing of non-combustible particulate matter to be heat processed in said products of combustion as a dispersed heat sink in a quantity to substantially sufficiently cool said products of combustion from its peak temperature to a temperature less than that at which NO is substantially produced in a time less than the chemical kinetic formation time of NO produced in said products of combustion.

4. The method as called for in claim 3 wherein said fuel and oxidizer is burned in an equivalence ratio selected to result in substantially not more than small amounts in said products of combustion of oxygen.

5. In the method of controlling $NO_x$ emissions from a combustion chamber for heat processing non-combustible particulate matter in which combustion of fuel produces products of combustion including $NO_x$ compounds which is vented to the atmosphere, the steps comprising:

(a) introducing a flow of a gaseous or liquid fuel into a combustion chamber;

(b) entraining non-combustible particulate matter to be heat processed into a flow of an oxidizer and introducing said entrained matter and flow of oxidizer into said combustion chamber;

(c) mixing and burning said fuel and oxidizer in said combustion chamber and producing therefrom products of combustion at a peak temperature substantially greater than the temperature at which NO is formed; and (d) controlling the entrainment of said non-combustible particulate matter in said oxidizer flow to provide in said products of combustion a dispersed heat sink in a quantity to substantially sufficient to cool said products of combustion from its peak temperature to a temperature less than that at which NO is substantially produced in a time less than the chemical kinetic formation time of NO produced in said products of combustion.

6. The method as called for in claim 5 wherein said fuel and oxidizer is burned in an equivalence ratio selected to result in substantially not more than small amounts in said products of combustion of oxygen.

7. The method as called for in claim 1 wherein said ratio is selected to result in substantially no appreciable amounts of oxygen in said products of combustion.

8. The method as called for in claim 1 wherein the fuel is a gas or liquid and the oxidizer is air.

9. The method as called for in claim 8 wherein said ratio is substantially stoichiometric.

10. The method as called for in claim 8 wherein said ratio is less than one.

11. The method as called for in claim 8 wherein said ratio is in the range of one to two and additionally including:

(a) exhausting said products of combustion and entrained particulate matter into a separation chamber and substantially separating said entrained particulate matter from said products of combustion; and (b) reducing the $NO_x$ content of said products of combustion downstream of said separation chamber.

12. The method as called for in claim 1 wherein said particles have a diameter in the range of about $10\mu$ to $40\mu$.

13. In the method of producing a glass product by heat processing non-combustible particulate glass batch material, the steps comprising:

(a) introducing and burning gaseous or liquid fuel and an oxidizer in a predetermined equivalence ratio and producing therefrom products of combustion at a peak flame temperature substantially greater than the melting temperature of glass and the temperature at which NO is formed;

(b) entraining and dispersing a predetermined quantity of non-combustible particulate glass batch material in at least said oxidizer prior to introduction into said combustion chamber, said particulates having a diameter in the range of about $10\mu$ to $100\mu$;

(c) causing said products of combustion and entrained glass batch material to form at least one stream;

(d) causing said at least one stream to be directed at least generally toward a first surface at a velocity and in a manner to form a gas flow field at about said first surface causing said glass batch material to be separated from said at least one stream by contacting and being deposited on said first surface;

(e) controlling the maximum residence time of said glass batch material in said products of combustion and said at least one stream to substantially a time less than the chemical kinetic formation time of NO produced in said products of combustion;

(f) controlling said predetermined quantity of glass batch material entrained in said oxidizer to effect substantially sufficient cooling of said products of combustion from its peak flame temperature to a temperature less than that at which NO is substantially produced in substantially a time less than that required for said entrained glass batch material to reach said first surface;

(g) causing said deposited material to flow from said first surface over a second surface to a collection region as a viscous layer having an exposed surface; and (h) causing separated products of combustion after leaving said first surface to be exhausted to the atmosphere.

14. The method as called for in claim 1 wherein said particulate matter is glass batch material and said flame temperature is additionally substantially greater than the melting temperature of glass.

15. The method as called for in claim 3 wherein said particulate matter is glass batch material and said peak temperature is additionally substantially greater than the melting temperature of glass.

* * * * *